(12) United States Patent
Kashi

(10) Patent No.: US 11,465,678 B2
(45) Date of Patent: Oct. 11, 2022

(54) METHOD FOR OPERATING A STEERING SYSTEM AND STEERING SYSTEM

(71) Applicant: ZF Automotive Germany GmbH, Alfdorf (DE)

(72) Inventor: Keiwan Kashi, Düsseldorf (DE)

(73) Assignee: ZF Automotive Germany GmbH, Alfdorf (DE)

( * ) Notice: Subject to any disclaimer, the term of this patent is extended or adjusted under 35 U.S.C. 154(b) by 242 days.

(21) Appl. No.: 16/812,786

(22) Filed: Mar. 9, 2020

(65) Prior Publication Data
US 2020/0283063 A1   Sep. 10, 2020

(30) Foreign Application Priority Data

Mar. 8, 2019   (DE) .......................... 102019105922.4

(51) Int. Cl.
*B62D 6/00*   (2006.01)
*B62D 5/04*   (2006.01)
(Continued)

(52) U.S. Cl.
CPC ............. *B62D 6/008* (2013.01); *B62D 6/003* (2013.01); *B62D 1/286* (2013.01); *B62D 5/0463* (2013.01); *B62D 15/025* (2013.01)

(58) Field of Classification Search
CPC ...... B62D 6/008; B62D 15/029; B62D 5/006; B62D 15/025; B62D 1/286; B60W 2510/202; B60Q 5/005
(Continued)

(56) References Cited

U.S. PATENT DOCUMENTS 6,404,156 B1 *   6/2002   Okanoue .............. B62D 5/0463
                                                                     318/432
10,286,909 B2 *   5/2019   Fu .......................... B60W 30/12
(Continued)

FOREIGN PATENT DOCUMENTS

AU    2013290175 A1 *   2/2015   ......... B60G 17/0162
CN    110337400 A   * 10/2019   ............. B62D 1/181
(Continued)

OTHER PUBLICATIONS

"Highly Automated Vehicle Systems" by Dr. Gáspár Péter, Dr. Szalay Zsolt, Aradi Szilárd; Published by: BME MOGI (year: 2014).*

(Continued)

*Primary Examiner* — Cuong H Nguyen
(74) *Attorney, Agent, or Firm* — Robert James Harwood

(57) ABSTRACT

A method for operating a steer-by-wire steering system of a motor vehicle is proposed. The steer-by-wire steering system includes a steering wheel, a force feedback actuator coupled to the steering wheel, a steering actuator coupled to a steerable wheel, and a control system. The method includes a) the determination of steering information while taking into account a steering wheel angle and/or a driver's steering torque applied to the steering wheel by the driver; b) controlling the steering actuator while taking into account the steering information to adjust a desired wheel steering angle of the steerable wheel; c) controlling the force feedback actuator for setting a steering wheel torque; and d) providing a threshold value associated with steering wheel torque and/or the wheel steering torque; e) generating a torque value representing or reproducing the steering wheel torque and/or the wheel steering torque; and f) outputting an overshoot signal if the torque value reaches the threshold (Continued)

value. A corresponding steer-by-wire steering system is also proposed.

17 Claims, 1 Drawing Sheet

(51) Int. Cl.
*B62D 15/02* (2006.01)
*B62D 1/28* (2006.01)

(58) Field of Classification Search
USPC .................................................. 701/41–42
See application file for complete search history.

(56) References Cited

U.S. PATENT DOCUMENTS

| | | | | |
|---|---|---|---|---|
| 10,549,770 | B2 * | 2/2020 | Albrecht | B62D 1/286 |
| 10,787,192 | B1 * | 9/2020 | Katzourakis | B62D 6/08 |
| 10,858,040 | B2 * | 12/2020 | Hulten | B60W 30/02 |
| 10,889,321 | B2 * | 1/2021 | Arnold | B62D 5/0466 |
| 2013/0268160 | A1 * | 10/2013 | Trombley | B62D 15/027 |
| | | | | 701/42 |
| 2018/0312193 | A1 * | 11/2018 | Arnold | B62D 5/0466 |
| 2019/0047618 | A1 * | 2/2019 | Hulten | B60W 30/02 |
| 2020/0283063 | A1 * | 9/2020 | Kashi | B62D 6/003 |

FOREIGN PATENT DOCUMENTS

| | | | | | |
|---|---|---|---|---|---|
| CN | 111661149 | A | * | 9/2020 | ........... B62D 15/029 |
| DE | 19912169 | A1 | | 7/2000 | |
| DE | 60311503 | T2 | * | 10/2007 | ........... B60T 8/1764 |
| DE | 102015215052 | A1 | * | 2/2017 | ............. B62D 1/286 |
| DE | 102017202598 | A1 | * | 8/2018 | ........... B62D 5/0463 |
| DE | 102017109081 | A1 | * | 10/2018 | ........... B62D 5/0466 |
| DE | 102019105922 | A1 | * | 9/2020 | ........... B62D 15/029 |
| DE | 102020200405 | A1 | * | 7/2021 | ............. B62D 1/286 |
| DE | 102015005020 | B4 | * | 8/2021 | ............. B62D 5/003 |
| EP | 3331749 | B1 | * | 4/2019 | ........... B62D 15/025 |
| JP | 2010241167 | A | * | 10/2010 | ............... B62D 5/04 |
| KR | 20190047618 | A | * | 5/2019 | ............. A24F 40/46 |
| KR | 20200124383 | A | * | 11/2020 | ............. Y02P 60/21 |
| WO | WO-2017021192 | A1 | * | 2/2017 | ............. B62D 1/286 |
| WO | WO-2017135884 | A1 | * | 8/2017 | ........... B60W 30/02 |
| WO | WO-2018153443 | A1 | * | 8/2018 | ............. B62D 1/181 |

OTHER PUBLICATIONS

J. Zhang et al., "Adaptive Sliding Mode-Based Lateral Stability Control of Steer-by-Wire Vehicles With Experimental Validations," in IEEE Transactions on Vehicular Technology, vol. 69, No. 9, pp. 9589-9600, Sep. 2020, doi: 10.1109/TVT.2020.3003326 (Year: 2020).*
T. Chugh, F. Bruzelius, M. Klomp and B. Jacobson, "Steering Feedback Transparency Using Rack Force Observer," in IEEE/ASME Transactions on Mechatronics, doi: 10.1109/TMECH.2022.3144245 (Year:2022).*

\* cited by examiner

METHOD FOR OPERATING A STEERING SYSTEM AND STEERING SYSTEM

CROSS-REFERENCE TO RELATED APPLICATION

This application claims priority to German Patent Application No. 102019105922.4, filed Mar. 8, 2019, the disclosure of which is incorporated herein by reference in its entirety.

TECHNICAL FIELD

The present disclosure relates to a method for operating a steer-by-wire steering system of a motor vehicle. The present disclosure also relates to a steer-by-wire steering system for a motor vehicle.

BACKGROUND

For steer-by-wire steering systems, the steering wheel and steered wheels are mechanically decoupled. The wheels are therefore steered by steering actuators in order to adjust the desired wheel steering angle, also called steering angle. In contrast to conventional steering systems, steer-by-wire steering systems do not have a steering column transmitting a steering force or torque between the steering wheel and the steered wheels. Conventional steering systems according to the present understanding are purely mechanical steering systems and servo steering systems with or without superimposed steering. The removal of the steering column in steer-by-wire steering systems not only offers many new design degrees of freedom but also additional advantages in occupant protection.

With the elimination of mechanical coupling by the steering column, the driver loses the natural force feedback by the steering torque, in particular the steering wheel torque. The steering wheel torque that reacts on the driver in conventional steering systems is dependent inter alia on lateral acceleration, steering angle, speed and the surface condition of the ground, for example. The haptic perception of the steering wheel torque thus provides the driver with important information about the driving situation, the vehicle condition and the tire-roadway interaction.

Steer-by-wire steering systems therefore regularly include a force feedback actuator that superimposes a synthetic steering wheel torque on the steering wheel. The synthetic steering wheel torque is intended to mimic the steering wheel torque of a conventional steering system for the driver and thus also to produce a good and intuitive driving feeling with a steer-by-wire steering system. The force feedback by the synthetic steering wheel torque strengthens the driver's awareness of the situation and improves the control circuit of the driver, vehicle and environment. However, the currently available force feedback actuators for steer-by-wire steering systems are relatively large, heavy, mechanically complex and expensive due to the maximum torque to be provided and the high demands on dynamics.

SUMMARY

It is an object of the present disclosure to provide a method for operating a steer-by-wire steering system and a corresponding steer-by-wire steering system, i.e. the use of a smaller, lighter, simpler and/or cheaper force feedback actuator and still to create a good and intuitive driving experience for the driver of a motor vehicle.

The object is achieved by a method for operating a steer-by-wire steering system as claimed in claim 1. The steer-by-wire steering system comprises a steering wheel, at least one force feedback actuator coupled to the steering wheel, at least one steering actuator coupled to at least one steerable wheel and a control system. The method involves the following steps:

a) Steering information is determined taking into account a steering wheel angle and/or a driver's steering torque applied by the driver to the steering wheel. The steering information can be determined by the control system. The steering information may include one or more values that represent the steering wheel angle and/or the driver's steering torque. The steering wheel angle is the angle of rotation of the steering wheel measured from the straight-ahead line. For example, the steering wheel angle is determined by means of a steering wheel angle sensor. The driver's steering torque, i.e. the torque applied to the steering wheel by the driver when steering, can be determined by means of a force or torque sensor, for example.

b) The steering actuator is controlled taking into account the steering information in order to achieve a desired wheel steering angle of the steerable wheel. The wheel steering angle is the angle between the longitudinal axis of the vehicle and the lines of intersection of the wheel center planes of the respective steered wheels with the road plane. In the context of the linear single-track model, the mean steering angle is understood as the steering angle of the steered axle in a zero force state. For example, the steering actuator is controlled by the control system. The steering actuator can adjust the wheel steering angle or the wheel steering angles of one or more steerable wheels. As an example, each steerable wheel can be assigned its own steering actuator for individual wheel steering. In the case of Ackermann steering, on the other hand, a steering actuator can also steer two steered wheels simultaneously by means of a track rod. The redundant use of multiple steering actuators, which can be assigned to the respective steerable wheel, increases reliability. In addition to the front wheels, the rear wheels can also be steered with rear axle steering.

c) The force feedback actuator is controlled to adjust a current steering wheel torque by taking into account the vehicle information, driving condition information and/or steering information. Feedback is generated for the driver with the steering wheel torque that represents or reproduces a current steering torque resulting from a current wheel steering torque on the steered wheel. The wheel steering torque is the torque resulting from the forces and torques acting on the wheel around the vertical axis. Advantageously, the steering torque can be a cumulative steering torque, resulting from the current wheel steering torques on all steered wheels. The force feedback actuator can be controlled by the control system. The steering wheel torque is introduced into the steering wheel by the force feedback actuator and usually counteracts the driver's torque. The manual steering torque is applied to the steering wheel by the driver during the steering process.

d) A threshold value is provided. The threshold value is assigned to the steering wheel torque and/or the wheel steering torque. For example, the threshold value may correspond to a predetermined steering wheel torque and/or wheel steering torque. Alternatively, the threshold value may correspond to a predetermined torque value, for example.

e) A torque value is produced. The torque value reproduces or represents the steering wheel torque and/or the wheel steering torque. In other words, the torque value can be a function of the wheel steering torque, for example. The wheel steering torque or the cumulative steering torque can be measured in this case with a sensor or calculated on the basis of a model, for example. The torque value can reproduce a resulting steering wheel torque based on the wheel steering torque, for example.

f) If the torque value reaches and/or exceeds the threshold value, an overshoot signal is output. In other words, the overshoot signal is output when the torque value is greater than or equal to the associated threshold value. The overshoot signal can be output by the control system.

The driver can be signaled by means of the method according to the present disclosure independently of the performance of the force feedback actuator if a steering wheel torque to be output from the force feedback actuator and/or a torque value representing or reproducing the wheel steering torque reach(es) and/or exceed(s) a predetermined threshold value. While the usual wheel steering torques in normal driving are of a limited magnitude that can be calculated well, some driving situations can lead to extremely high wheel steering torques. Examples of these situations can be steering and lateral impact of a steered wheel directly on a curb, as well as driving over bumps, potholes and curbs at high speed. In order to be able to depict these wheel steering torques that are rare but that have a very large effect as (equally high) synthetic steering wheel torques, the force feedback actuator must be correspondingly generously dimensioned. With an undersized force feedback actuator and without the use of the teaching according to the present disclosure, the steering torque occurring could not be replicated by the synthetic steering wheel torque or otherwise signaled to the driver. In all probability, the driver would therefore not recognize the driving situation as critical at all. Damage to the vehicle and in particular to the chassis or steering system may possibly also occur.

According to an advantageous aspect, the steering wheel torque can be limited to a steering wheel limit torque. In particular, the steering wheel limit torque (in terms of magnitude) can be below the steering wheel torque that can be fully controllable (in magnitude) in the steering wheel by the force feedback actuator. The threshold value can be selected in such a way that the overshoot signal is generated when the steering wheel torque is limited to the steering wheel limit torque. This aspect makes it possible, for example, to output the overshoot signal by means of the force feedback actuator. For this purpose, the overshoot signal can be modulated onto the actual steering wheel torque as a (steering wheel torque) oscillation by way of example. The oscillation angle, the amplitude and/or the frequency of the oscillation can represent a measure of the overshoot.

Advantageously, it can be provided to output the overshoot signal by means of a haptic signal transmitter. The haptic signal transmitter can be a haptic actuator or, as described above, the force feedback actuator itself. The haptic actuator can be arranged in, on or near the steering wheel. The haptic actuator is, for example, a vibrating motor with a rotating eccentric mass or a lifting magnet actuator with a mass that can be linearly accelerated electromagnetically. Haptic signal transmitters have the advantage that their signals are processed particularly quickly by the human body.

Alternatively or additionally, the overshoot signal can be output by means of an acoustic signal transmitter. Advantageously, several acoustic signal transmitters (for example the car radio/infotainment system) are regularly already installed in a motor vehicle. These signal transmitters can be used cost-effectively or free of charge and without much effort. Alternatively, a piezo buzzer can be provided for the output of the overshoot signal, for example. Piezo buzzers are very inexpensive and also easy to hear when driving noises and ambient noises are loud.

Alternatively or additionally, the overshoot signal can be output by means of an optical signal transmitter. Optical signal transmitters are particularly suitable for combining with haptic or acoustic signal transmitters. Combined use of different sensory organs can increase the human response to these stimuli.

Furthermore, the object is achieved by a steer-by-wire steering system that includes a steering wheel, at least one force feedback actuator coupled to the steering wheel to generate an adjustable steering wheel torque, at least one steering actuator coupled to at least one steerable wheel for adjusting a wheel steering angle of the steerable wheel and a control system. Where the following features and advantages have already been described in the context of the method according to the present disclosure, a further detailed description is dispensed with in order to reduce redundancies. However, the advantages and features also occur with the steer-by-wire steering system.

The control system is designed and equipped to determine steering information including a steering wheel angle and/or a driver's steering torque applied by the driver to the steering wheel. The control system is also designed and set up to control the steering actuator while taking into account the steering information, and thus to adjust the wheel steering angle. The control system is further designed and equipped to control the force feedback actuator while taking into account vehicle information, driving condition information and/or steering information for adjusting the steering wheel torque, and to generate feedback for the driver. The feedback by means of the steering wheel torque is set up in such a way that a steering torque resulting from a current wheel steering torque on the steered wheel is represented or reproduced. Preferably, a cumulative steering torque resulting from current wheel steering torques on all steered wheels can be represented or reproduced by the steering wheel torque.

Finally, the control system is designed and equipped to produce a torque value that represents or reproduces the steering wheel torque and/or the wheel steering torque and to output an overshoot signal provided that the torque value reaches a threshold assigned to the steering wheel torque and/or the wheel steering torque.

According to an advantageous aspect, the control system and/or the force feedback actuator can be designed and set up to limit the steering wheel torque to a steering wheel limit torque. Further advantageously, the threshold value can be chosen so that the overshoot signal is generated when the steering wheel torque is limited to the steering wheel limit torque. Preferably, the force feedback actuator can be designed to also output the overshoot signal in addition to the feedback message. Advantageously, a steering wheel torque that can be maximally introduced into the steering wheel by the force feedback actuator is greater (in magnitude) than the steering wheel limit torque.

In addition to the force feedback actuator, the steer-by-wire steering system may include a haptic actuator coupled to the steering wheel that can output the overshoot signal. Alternatively or in addition to the haptic actuator, the steer-by-wire steering system may also have an acoustic signal transmitter and/or an optical signal transmitter for outputting the overshoot signal.

According to another optional aspect, the control system has a communication interface for communication with other systems of the motor vehicle and is designed and set up to output the overshoot signal via driver-vehicle interfaces of the other systems by means of the communication interface. In particular, the other systems may be infotainment systems (car radio, navigation system, etc.) and display devices of the dashboard (display of a digital cockpit, multifunction display, signal light, etc.).

Advantageously, the steer-by-wire steering system is designed so that the previously described method according to the present disclosure can be carried out therewith.

BRIEF DESCRIPTION OF THE DRAWINGS

Further advantages and properties of the present disclosure result from the following description and the drawings to which reference is now made. In the figures.

DETAILED DESCRIPTION

Figure 1:
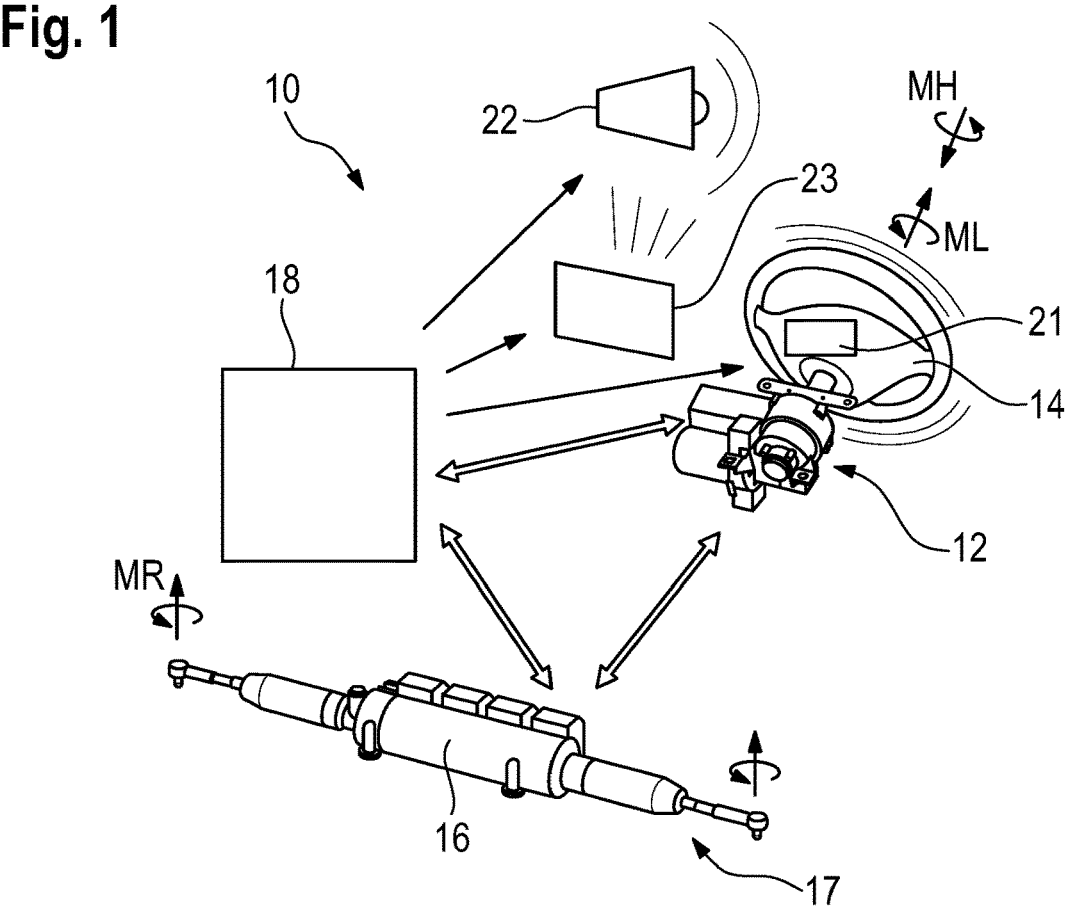
FIG. 1 shows a steering system according to the present disclosure in a schematic representation.

The steer-by-wire steering system 10 shown in FIG. 1 includes a steering wheel 14, a force feedback actuator 12 coupled to the steering wheel 14, a steering actuator 16 coupled to the steerable front wheels (not shown) and a control system 18. In addition, an acoustic signal transmitter 22, an optical signal transmitter 23 and a haptic signal transmitter 21 are shown.

Steering information is determined using a steering wheel angle (rotation angle of the steering wheel) and/or a driver's steering torque MH applied to the steering wheel by the driver. The steering information is determined by the control system 18. The steering information includes one or more values that represent the steering wheel angle and/or the driver's steering torque. The steering wheel angle is determined by means of a steering wheel angle sensor in the steering wheel 14 or in the force feedback actuator 12. The driver's steering torque MH is determined by means of a force or torque sensor in the steering wheel 14 or in the force feedback actuator 12.

The steering actuator 16 is controlled by the control system 18, taking into account the determined steering information, in order to achieve a desired wheel steering angle of the steerable wheels. The steering actuator 16 then adjusts the wheel steering angles of the steerable wheels by means of a track rod 17. Alternatively, with individual wheel steering, each steerable wheel can have its own steering actuator 16 assigned. The redundant use (not visible here) of several steering actuators increases reliability. In addition to the front wheels, the rear wheels can also be steerable (not shown) in the case of a rear axle steering system.

The control system 18 also comprises a communication interface for communication with other systems of the motor vehicle. By means of the communication interface, the overshoot signal is output via driver-vehicle interfaces 22, 23 of the other systems. In the embodiment shown, the other systems are infotainment systems (car radio, navigation system, etc.) and dashboard display devices (display of a digital cockpit, multifunction display, signal light, etc.).

The force feedback actuator 12 is controlled to adjust a current steering torque ML while taking into account vehicle information (for example vehicle weight), driving condition information (for example speed, lateral acceleration) and/or steering information (for example steering wheel angle, mean wheel steering angle).

With the steering wheel torque ML, feedback for the driver is generated based on a cumulative steering torque resulting from current wheel steering torques MR on all steered wheels. The force feedback actuator 12 is controlled by the control system 18. The steering wheel torque ML is introduced into the steering wheel 14 by the force feedback actuator 12 and usually counteracts the drivers steering torque MH.

A torque value 31-33 is generated. The torque value 31-33 represents or reproduces the steering wheel torque ML and/or the wheel steering torque MR. In other words, the torque value 31-33 can be a function of the wheel steering torque MR, for example. In this case the wheel steering torque MR or the cumulative steering torque may be measured with a sensor in the steering actuator 16, for example, or may be calculated on the basis of a mathematical model of the control system 18. The torque value 31-33 represents the steering wheel torque ML based on the wheel steering torque MR in the exemplary embodiments shown.

Figure 2:
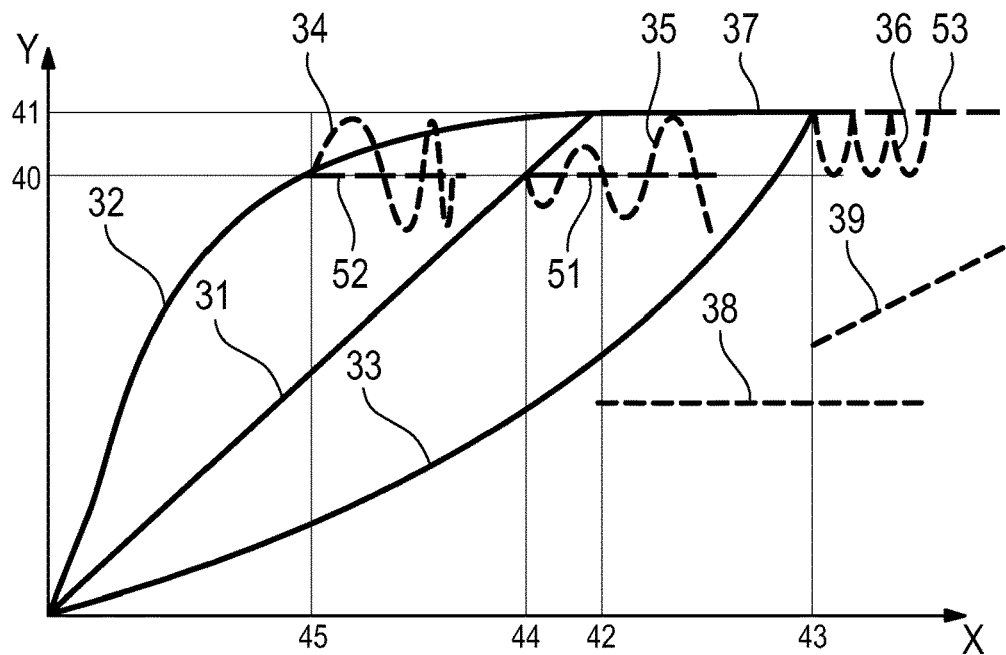
FIG. 2 shows the combined schematic representation of several exemplary embodiments.

Several different exemplary embodiments are described in detail based on FIG. 2. A represented or reproduced (cumulative) wheel steering torque MR is plotted on the abscissa X. The examples of steering wheel torques ML superimposed on the steering wheel 14 by the force feedback actuator 12 are also plotted on the ordinate. Different examples of torque values 31-33 are shown as a function of wheel steering torque MR and steering wheel torque ML. It should be taken into account that threshold values 40-45 do not necessarily have to be assigned to certain torque values 31-33 but still can be. The assignment of the threshold values 40-45 is carried out rather to the respective wheel steering torque MR and/or the respective steering wheel torque ML in particular. On the other hand, the torque value 31-33 represents or reproduces the wheel steering torque MR and/or the steering torque ML. The steering wheel torques ML can be directly or indirectly dependent on the torque values or the wheel steering torques MR, but this is not necessarily the case. Symbolically represented overshoot signals 34-36, 38-39, which are explained in more detail later, are also plotted in the diagram.

FIG. 2 shows three exemplary embodiments with three different wheel steering torque-steering wheel torque profiles. For a simpler representation, it is assumed that the wheel steering torque-steering wheel torque profiles in the exemplary embodiment correspond to the torque values 31-33 shown. The first wheel steering torque profile 31 is designed to be essentially proportional. The second wheel steering torque profile 32 is designed to be essentially degressive. The third wheel steering torque profile 33 is designed to be essentially progressive. For example, the second wheel steering torque profile 32 is in many cases suitable for creating a good driving feeling for the driver. For example, this applies in particular when the lateral acceleration of the vehicle is used to adjust the steering wheel torque ML.

The respectively provided threshold value 40-45 is assigned to the steering wheel torque ML and/or the wheel steering torque MR. A first example threshold value 41 corresponds, for example, to a predetermined steering wheel torque ML, in this case the maximum steering wheel torque 37 that the force feedback actuator 12 can provide. Another example threshold value 40, on the other hand, corresponds to a steering wheel torque ML that is lower than the maximum steering wheel torque 37 that can be provided. Yet more threshold values 42-45 are plotted on the abscissa X. For example, they may correspond to predetermined wheel steering torques MR, predetermined torque values 31-33 or predetermined lateral accelerations acting on the vehicle.

If the torque value reaches and/or exceeds the threshold value 40-45, an overshoot signal 34-36, 38, 39 is output. In other words, the overshoot signal is output when the torque value is greater than or equal to the associated threshold value 40-45. The overshoot signal is output by the control system 18, possibly by means of further components of the steer-by-wire steering system 10.

The driver can thus be signaled in this way independently of the performance of the force feedback actuator 12 (the maximum torque that can be provided), if a steering wheel torque ML to be output by the force feedback actuator 12 and/or a torque value representing or reproducing the torque value of the wheel steering torque MR reach(es) and/or exceed(s) a predetermined threshold value 40-45.

Advantageously, the steering wheel torque ML is limited to a steering wheel limit torque 51-53. In terms of magnitude, the steering wheel limit torque 51-53 is below the maximum steering wheel torque ML (reference character 37) that can be introduced into the steering wheel by the force feedback actuator 12. The threshold value 43-45 of the respective exemplary embodiments is chosen so that the overshoot signal 34-36, 38, 39 is generated when the steering wheel torque ML is limited to the steering wheel limit torque 51-53.

Advantageously, it can be provided to output the overshoot signal 34-36, 38, 39 by means of a haptic signal transmitter 12, 21. The haptic signal transmitter 12, 21 can be a haptic actuator 21 or, as described above, the force feedback actuator 12 itself. The haptic actuator 21 can be arranged in particular in, on or near the steering wheel 14. Alternatively or additionally, the overshoot signal 38, 39 can be output by means of an acoustic signal transmitter 22 and/or an optical signal transmitter 23.

The first three overshoot signals 34-36 shown of the exemplary embodiments are output by the control system 18 by means of the force feedback actuator 12. For this purpose, the respective overshoot signal 34-36 can be modulated on the actual steering wheel torque ML (reference character 51-53) as a (steering wheel torque) oscillation by way of example. The oscillation angle, (torque) amplitude and/or frequency of the oscillation can represent a measure of the overshoot.

In the first and second exemplary embodiments, the overshoot signal 35, 34 includes a measure of the overshoot of the respective threshold value 40, 44, 45. The amplitude and/or the oscillation angle of the steering wheel torque oscillation of the first exemplary embodiment increase(s) with increasing overshoot of the threshold value 40, 44. The frequency of the steering wheel torque oscillation of the first exemplary embodiment remains unchanged. The frequency of the steering wheel torque oscillation of the second exemplary embodiment increases with increasing overshoot of the threshold value 40, 45. The amplitude and/or the oscillation angle of the steering wheel torque oscillation of the second exemplary embodiment remain(s) unchanged.

In the third exemplary embodiment, the overshoot signal 36 is independent of the degree of overshoot of the threshold value 41, 43. The amplitude, oscillation angle and frequency of the steering wheel torque oscillation remain constant with increasing overshoot.

The steer-by-wire steering systems 10 of the exemplary embodiments are designed and set up to perform the previously described method according to the present disclosure.

What is claimed is:

1. A method for operating a steer-by-wire steering system of a motor vehicle, wherein the steer-by-wire steering system includes a steering wheel, a force feedback actuator coupled to the steering wheel, a steering actuator coupled to a steerable wheel, and a control system, with the following steps:
   Determining steering information while taking into account a steering wheel angle and/or a driver's steering torque applied to the steering wheel by the driver,
   Controlling the steering actuator while taking into account the steering information to adjust a desired wheel steering angle of the steerable wheel,
   Controlling the force feedback actuator for adjusting a steering wheel torque while taking into account vehicle information, driving condition information and/or steering information to generate feedback for the driver, which represents or reproduces a steering torque on the steered wheel, in particular a cumulative steering torque resulting from wheel steering torques on all steered wheels,
   wherein the method also includes the following steps:
   Providing a threshold value associated with the steering torque and/or the wheel steering torque,
   Producing a torque value representing or reproducing the steering wheel torque and/or the wheel steering torque, and
   Outputting an overshoot signal if the torque value at least reaches the threshold value, a user-perceptible characteristic of the overshoot signal increasing as the torque value increases beyond the threshold value.

2. The method as defined in claim 1, further including:
   Limiting the steering wheel torque to a steering wheel limit torque, wherein the threshold value is selected in such a way that the overshoot signal is generated when the steering wheel torque is limited to the steering wheel limit torque.

3. The method as defined in claim 1, wherein the overshoot signal is output by means of a haptic signal transmitter, in particular wherein the haptic signal transmitter is the force feedback actuator or a haptic actuator.

4. The method as defined in claim 1, wherein the overshoot signal is output by means of an acoustic signal transmitter.

5. The method as defined in claim 1, wherein the overshoot signal is output by means of an optical signal transmitter.

6. A steer-by-wire steering system for a motor vehicle including:
   a steering wheel,
   a force feedback actuator coupled to the steering wheel for producing an adjustable steering wheel torque,
   a steering actuator coupled to a steerable wheel for adjusting a wheel steering angle of the steerable wheel, and
   a control system, wherein the control system is designed to
   determine steering information while taking into account a steering wheel angle and/or a driver's steering torque applied to the steering wheel by the driver, control the steering actuator while taking into account the steering information in order to adjust the wheel steering angle, and control the force feedback actuator while taking into account vehicle information, driving condition information and/or steering information for adjusting the steering torque in order to generate feedback for the driver that represents or reproduces a steering torque on the steered wheel, in particular a cumulative steering torque resulting from wheel steering torques on all steered wheels, wherein the control system is further designed to produce a torque value that represents or reproduces the steering wheel torque and/or the wheel steering torque, and output an overshoot signal if the torque value at least reaches a threshold value assigned to the steering wheel torque and/or the wheel steering torque, a user-perceptible characteristic of the overshoot signal increasing as the torque value increases beyond the threshold value.

7. The steer-by-wire steering system as defined in claim 6, wherein the control system and/or the force feedback actuator are/is designed to limit the steering wheel torque to a steering wheel limit torque, and wherein the threshold value is selected in such a way that the overshoot signal is generated when the steering wheel torque is limited to the steering wheel limit torque.

8. The steer-by-wire steering system as defined in claim 6, wherein the force feedback actuator is designed to also output the overshoot signal in addition to the feedback.

9. The steer-by-wire steering system as defined in claim 6, further including a haptic actuator coupled to the steering wheel, wherein the haptic actuator is designed to output the overshoot signal.

10. The steer-by-wire steering system as defined in claim 6, further including an acoustic signal transmitter and/or an optical signal transmitter that are designed to output the overshoot signal.

11. The steer-by-wire steering system as defined in claim 6, wherein the control system has a communication interface for communication with other systems of the motor vehicle, and wherein the control system is designed to output the overshoot signal using the communication interface via driver-vehicle interfaces of the other systems.

12. The steer-by-wire steering system as defined in claim 6, wherein the user-perceptible characteristic of the overshoot signal is at least one of auditory, vibratory, oscillatory, and optical.

13. The steer-by-wire steering system as defined in claim 6, wherein the user-perceptible characteristic of the overshoot signal includes at least one of an amplitude, a frequency and an oscillation angle, at least one of the amplitude, a frequency and an oscillation angle increasing as the torque value increases beyond the threshold value.

14. The steer-by-wire steering system as defined in claim 6, wherein the overshoot signal is output by means of the force feedback actuator as a user-perceptible oscillation on the steering wheel, at least one of an oscillation angle, amplitude and frequency increasing as the torque value increases beyond the threshold value.

15. The method as defined in claim 1, wherein the user-perceptible characteristic of the overshoot signal is at least one of auditory, vibratory, oscillatory, and optical.

16. The method as defined in claim 1, wherein the user-perceptible characteristic of the overshoot signal includes at least one of an amplitude, a frequency and an oscillation angle, at least one of the amplitude, a frequency and an oscillation angle increasing as the torque value increases beyond the threshold value.

17. The method as defined in claim 1, wherein the overshoot signal is output by means of the force feedback actuator as a user-perceptible oscillation on the steering wheel, at least one of an oscillation angle, amplitude and frequency increasing as the torque value increases beyond the threshold value.

* * * * *